US010298397B2

(12) United States Patent
Bone et al.

(10) Patent No.: US 10,298,397 B2
(45) Date of Patent: May 21, 2019

(54) SETTING A PASSWORD ON A DEVICE (71) Applicant: VODAFONE IP LICENSING LIMITED, Newbury, Berkshire (GB)

(72) Inventors: Nicholas Bone, London (GB); Tim Snape, London (GB)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 32 days.

(21) Appl. No.: 15/168,373

(22) Filed: May 31, 2016

(65) Prior Publication Data

US 2016/0373258 A1    Dec. 22, 2016

(30) Foreign Application Priority Data

May 28, 2015 (GB) .................................... 1509182.0

(51) Int. Cl.
*G06F 9/00* (2006.01)
*H04L 9/32* (2006.01)
*H04W 12/04* (2009.01)
*H04W 12/06* (2009.01)
*G06F 9/4401* (2018.01)
*G06F 21/57* (2013.01)
*H04W 4/70* (2018.01)
*H04W 4/00* (2018.01)

(52) U.S. Cl.
CPC .......... *H04L 9/3226* (2013.01); *G06F 9/4401* (2013.01); *G06F 21/575* (2013.01); *H04W 12/04* (2013.01); *H04W 12/06* (2013.01); *H04W 4/005* (2013.01); *H04W 4/70* (2018.02)

(58) Field of Classification Search
CPC .................................................... H04L 9/3226

USPC ......... 455/410; 1/1; 713/172, 153, 183, 168, 713/189; 726/5, 8
See application file for complete search history.

(56) References Cited

U.S. PATENT DOCUMENTS 7,069,433 B1 * 6/2006 Henry ................... G06Q 40/00
                                                            380/270
8,001,379 B2 * 8/2011 Daskalopoulos ... H04L 63/0869
                                                            713/168
8,281,372 B1 * 10/2012 Vidal ...................... H04L 51/12
                                                            726/5

(Continued)

FOREIGN PATENT DOCUMENTS

GB        2486798 A        6/2012
WO     WO 2008/004106 A1    1/2008
WO     WO 2009/103623 A2    8/2009

OTHER PUBLICATIONS

European Search Report for EP 16 17 1814 dated Oct. 10, 2016.
(Continued)

*Primary Examiner* — Aurel Prifti
(74) *Attorney, Agent, or Firm* — Workman Nydegger (57) ABSTRACT

Embodiments disclosed herein provide a server, a device and methods for providing security data to a device requiring a password for use in protecting a function of the device. An example method comprises communicating a device identifier to the server; the server communicating security data to the device, wherein the password is derivable, at least in part, from the security data; the device deriving the password, at least in part, from the security data and storing the password as the access code for the protected function; and the server storing the device identifier with an association to the password.

14 Claims, 1 Drawing Sheet

(56) References Cited

U.S. PATENT DOCUMENTS

| | | | | | |
|---|---|---|---|---|---|
| 8,843,125 | B2* | 9/2014 | Kwon | | H04L 63/067 |
| | | | | | 455/410 |
| 8,903,095 | B2* | 12/2014 | Norrman | | H04L 63/14 |
| | | | | | 380/281 |
| 9,185,089 | B2* | 11/2015 | Khan | | H04L 63/062 |
| 9,509,686 | B2* | 11/2016 | Anantha | | H04L 9/0897 |
| 9,525,548 | B2* | 12/2016 | Marshall | | H04L 9/0825 |
| 9,775,029 | B2* | 9/2017 | Lopez | | H04W 12/04 |
| 2002/0164031 | A1* | 11/2002 | Piikivi | | G06Q 20/12 |
| | | | | | 380/270 |
| 2004/0073795 | A1* | 4/2004 | Jablon | | H04L 9/0844 |
| | | | | | 713/171 |
| 2004/0168063 | A1* | 8/2004 | Revital | | H04N 7/165 |
| | | | | | 713/172 |
| 2006/0196931 | A1* | 9/2006 | Holtmanns | | G06Q 20/3552 |
| | | | | | 235/380 |
| 2007/0005989 | A1* | 1/2007 | Conrado | | G06F 21/10 |
| | | | | | 713/189 |
| 2007/0157028 | A1* | 7/2007 | Lott | | G06F 21/31 |
| | | | | | 713/182 |
| 2008/0209221 | A1* | 8/2008 | Vennelakanti | | H04L 63/062 |
| | | | | | 713/183 |
| 2009/0235346 | A1* | 9/2009 | Steinberg | | G06F 21/31 |
| | | | | | 726/8 |
| 2010/0211999 | A1* | 8/2010 | Grobman | | H04L 9/3213 |
| | | | | | 726/5 |
| 2010/0218241 | A1* | 8/2010 | Faryna | | G06F 21/35 |
| | | | | | 726/5 |
| 2010/0268937 | A1* | 10/2010 | Blom | | H04L 63/061 |
| | | | | | 713/153 |
| 2013/0104214 | A1* | 4/2013 | Beck | | G06F 21/34 |
| | | | | | 726/7 |
| 2013/0275307 | A1* | 10/2013 | Khan | | G06Q 20/40 |
| | | | | | 705/64 |
| 2014/0129834 | A1* | 5/2014 | Brill | | H04L 9/321 |
| | | | | | 713/168 |
| 2016/0301532 | A1* | 10/2016 | Lim | | H04L 9/3263 |
| 2017/0041141 | A1* | 2/2017 | Anthony | | H04L 9/3226 |

OTHER PUBLICATIONS

Etsi: "Digital cellular telecommunications system (Phase 2+); Universal Mobile Telecommunications System (UMTS); LTE; Generic Authentication Architecture (GAA); Generic Bootstrapping Architecture (GBA) (3GPP TS 33.220 version 12.3.0 Release 12)", Oct. 1, 2014 (Oct. 1, 2014), XP055307380, Retrieved from the Internet: URL:http://www.etsi.org/deliver/etsits/133200_133299/133220/12.03.00_60/ts_133220v1_20300p.pdf [retrieved on Oct. 4, 2016] p. 12, line 4—p. 17, line 3 p. 25, line 17—p. 30, line 8; figure 4.3 p. 81, line 29—p. 89, line 6.

GB Search Report for GB1509182.0 dated Nov. 30, 2015.

* cited by examiner

SETTING A PASSWORD ON A DEVICE

CROSS REFERENCE TO RELATED APPLICATIONS

This application claims benefit and priority to GB Application Number 1509182.0, filed on May 28, 2015, the entirety of which is incorporated

TECHNICAL FIELD

The present disclosure relates to a server, customer device and methods for setting a password on a device.

BACKGROUND

Devices such as Customer Premises Equipment (also known as customer-provided equipment) (CPE) often require one or more preset device-specific passwords to be visible and known to a user of the device such that on first (and potentially also subsequent) uses of a protected function(s) of the device, the user may enter the password in order to access a protected function(s) of the device. Such passwords might include at least one of:
  Wi-Fi security password(s) and/or PIN(s) (for example, for Wired Equivalent Privacy (WEP), Wi-Fi Protected Access (WPA), Wi-Fi Protected Access II (WPA2), Wi-Fi Protected Setup (WPS), etc);
  administrative password(s) for access to a web-page management console; and
  password(s) for remote access to the device from the Internet (not just from a Local Area Network (LAN)).
Current means by which the password(s) are set and then given to a human user include:
  setting a generic preset password for all manufactured devices and displaying the generic password via a screen on the device and/or printing the generic password on the device and/or on some associated label, documentation or sticker; or
  generating and setting a unique preset password for the device and displaying the unique password via a screen on the device and/or printing the unique password on the device and/or on some associated label, documentation or sticker.

Generic preset passwords may create numerous security risks, because if users do not change the default password to their own, new password, the protected functionality of the device may easily be accessed by anyone with knowledge of the generic password.

Generating and setting a unique preset password for each device incurs a significant logistical overhead for the device manufacturer. The device manufacturer must generate and set the unique password, which increases the complexity and cost of manufacture.

Producing any associated unique label, documentation or sticker, to communicate the unique password to the user also increases costs. Furthermore, many devices would not usually have their own screen and providing one for displaying the unique preset password (as an alternative to printing the unique password) would also increase costs and/or compromise the form-factor of the device. The device manufacturer should also provide the unique preset password to a supplier of the device so that the unique password can be provided to the user in the event that the label, documentation or sticker are lost; this further increases costs, and creates a risk of bulk compromise of passwords.

There may also be significant security risks associated with unique preset passwords. Because the password will usually be displayed on or near the device, any person in close proximity to the device (for example, a visitor to the device owner's premises) will see (and may record) the password. Furthermore, anyone who steals the device will also have the password. Furthermore, there may be uncontrolled use of the password (for example, by minors, etc). Furthermore, if the device is re-sold, the original owner may retain a copy of the preset password such that if the new owner maintains the present password, the old owner may continue to access the protected function(s) of the device.

While it might be possible for the user of the device to change the preset password to one of their own, in practice users generally do not. In any case, regardless of whether a generic preset password or unique preset password is used, device manufactures will usually include a mechanism by which the device can be restored to factory settings (for example, by pushing and holding a power button etc), for use in the event that the user has set their own password, but then forgotten it. Again, this may be used by visitors, thieves, unauthorised parties etc to return the password to that displayed on or near the device in order to access the protected function(s).

Therefore, there is a desire to establish an initial password for a protected function(s) of a device and communicate that to a purchaser of the device with improved security at a minimum of cost.

U.S. Pat. No. 8,347,355 B2 describes techniques for establishing an initial password to enable a customer to validate a new CPE such that the CPE may be correctly configured by a management server. U.S. Pat. No. 8,347,355 B2 is particularly concerned with a scenario whereby a customer is supplied with a CPE for business purposes. IT staff or an administrator of the customer's employer set a one-time password that they give to the customer and add to a database with various details of the customer, such as a policy for the customer. As part of the validation process, the customer must enter their one-time password into a browser. If the password matches the password stored in the database, the CPE may be configured by the management server according to the customer policy saved in the database.

However, in this example, it is necessary for IT staff or administrators to set a unique initial password, store it in a database with corresponding customer information and then securely communicate the unique initial password to the customer. This represents a significant overhead and may suffer from security weaknesses if the customer does not properly look after their initial password, as explained above.

SUMMARY

The present disclosure provides a server (for example, a device management server) for communicating security data to a device (for example a CPE or an M2M device) requiring a password for use in protecting a function of the device, the server being configured to: receive a device identifier (for example, from the device); communicate the security data to the device, wherein the password is derivable, at least in part, from the security data; and store the device identifier with an association to the password.

The protected function of the device may comprise any function of the device wherein a user of the device is required to enter the correct password in order to access the protected function. For example, the protected function may be at least one of: facilitation of internet access via the device, configuration/administration settings for the device and/or remote access to the device from the internet.

Preferably, the password is a human-readable code suitable for use by humans. For example, it may be an alpha-numeric code of suitable length to be communicated to, and used by, humans.

The device identifier may be received from the device. The device identifier may comprise at least one of a serial number for the device, an alpha-numeric code, a MAC address for the device, DNS name for the device and/or a static IP address for the device.

The device identifier may be stored in memory on the server, or it may be stored elsewhere, for example in a database that is accessible to the server and that is co-located with, or located in a different place from, the server.

By communicating the security data to the device, the device may be manufactured, distributed and sold without a preset password for the protected function. The additional costs and overheads of generating and setting a unique preset password for each device may therefore be avoided. Furthermore, as will become apparent from this disclosure as a whole, the security risks associated with generic and unique preset passwords may also be avoided.

Preferably, the security data comprises data from which a shared key (for example, a Ks_NAF) is derivable by the device according to a bootstrapping process, and wherein the password is derivable, at least in part, from the shared key (for example, by hashing the shared key, by converting the shared key to base64, decimal or hex; by truncating the shared key to a human-convenient length, etc). Thus, the password is derivable, at least in part, from the security data. The bootstrapping process may be based on Generic Bootstrapping Architecture, GBA.

The shared key obtained using the bootstrapping process is random and unique, so each password may also be random and unique. Thus, the device is able to derive a random and unique password for use in protecting the function of the device.

The server may be configured to: establish a secure interface between the device and the server; and communicate the security data to the customer device via the secure interface. Optionally, the server is further configured to: use, at least in part, a bootstrapping process to establish the secure interface between the device and the server (for example, by using a shared key established in the bootstrapping process to set up a TLS or DTLS session). The bootstrapping process may be based on Generic Bootstrapping Architecture, GBA. The security data may comprise the password (which may have been derived by the server or any other suitable entity, or may be a random, or pseudo-random, code generated by the server or any other suitable entity) or an indication of which of a plurality of codes stored on the device is to be used as the password.

Preferably, the server is further configured to: receive from a customer interface equipment (for example, a desktop computer, a laptop computer, a tablet computer, a smart-phone, etc) a request for a password, the request comprising a customer device identifier (for example, the device identifier); and communicate the password associated with the customer device identifier to the customer interface equipment. In this way, the password can be communicated to the operator of the customer interface equipment, who may then use it to try to access the protected function of the device.

The server may already have established the password with the device, in which can the server may be configured to provide the password associated with the device identifier to the customer interface equipment if the customer device identifier matches the device identifier. Alternatively, the request for a password may comprise a request for a password to be established with the device. In this alternative, the server may communicate the security data to the device identified by the customer device identifier (such that the device may derive the password, at least in part, from the security data, as described above) and communicate the password to the customer interface equipment.

The server may be configured to: receive from a customer interface equipment (for example, a desktop computer, a laptop computer, a tablet computer, a smart-phone, etc) a request for a password, the request comprising a customer device identifier; and if the customer device identifier matches the device identifier and it is the first time that the server has received a request for the password associated with the customer device identifier, communicate the password to the customer interface equipment.

If the customer device identifier has been received previously, and the password associated with the customer device identifier has not been changed in the meantime (for example, by resetting the password, as explained later), it will not be the first time that the server has received a request for the password associated with the customer device identifier. The server may be configured not to communicate the password to the customer interface equipment in this event. Optionally, it may return an error message to the customer interface equipment.

If the customer device identifier has been received previously, but the password associated with the customer device identifier has been changed since the most recent previous receipt of the customer device identifier, it will be the first time that the server has received a request for the password associated with the customer device identifier (since the password associated with the customer device identifier is different from the previous password associated with the customer device identifier).

By providing the password to the customer interface equipment only if it is the first time that the server has received a request for the password associated with the customer device identifier, security of the protected function may be improved because multiple different entities may not independently obtain the password from the server.

The server may be further configured to disable the password if a customer identifier that matches the device identifier is not received within a period of time since storing the device identifier with an association to the password. The password may be disabled by deleting the password, or marking it as inactive. This may improve security by preventing an attacker from doing a mass harvest of passwords that have not yet been collected by a legitimate user of the device.

Preferably, the server is further configured to: receive a first user contact identifier; and store the first user contact identifier with an association to the device identifier and/or the password.

The server may be further configured to: recognise that a password reset trigger on the device has been actuated; and communicate a password reset alert to the first user contact identifier. The server may be configured to recognise that a password reset trigger on the device has been actuated from the receipt of a password reset request from the device and/or from receipt of a device identifier from a device for which it already has stored an associated password (meaning that a new, reset password is required by the device). The registered user may thus be given the opportunity to respond to the password reset alert, for example to send a confirmation of password reset (indicating that they did request a password reset), or to send an indication that a password reset is not desired (which might indicate that a malicious entity is attempting to reset the password without the registered user's knowledge).

The server may be further configured to, on receipt of a confirmation of password reset in response to the password reset alert: communicate new security data to the device, wherein a new password is derivable, at least in part, from new security data; and store the device identifier with an association to the new password. Optionally, the server may take no action to reset the password until the confirmation of password reset is received. In this way, security of the protected function of the device may be improved because the password may only be reset when the registered user has confirmed that that is what they would like to do.

The server may further be configured to: suspend the function on the device (which may be achieved by suspending only the function of the device and/or by disabling the device altogether) until the confirmation of password reset is received in response to the password reset alert. In this way, security of the protected function of the device may be even further improved because an attempt to reset the password would prevent everyone (even those in possession of the password) from accessing the protected function of the device until the registered user confirms that they would like to reset the password and the new password has been set.

The server may be further configured to, on receipt of an indication in response to the password reset alert that a password reset is not desired, suspend the function of the device (which may be achieved by suspending only the function of the device and/or disabling the device altogether). In this way, security of the protected function of the device may be even further improved because a malicious attempt to reset the password may result in all users of the device being preventing from accessing the protected function.

The server may be further configured to recognise that a password reset trigger on the device has been actuated and set a multiple resets flag if the number of password reset trigger actuations in a reset period of time exceeds a reset threshold. The multiple resets flag may highlight a possible war of control for the device, which may be investigated further, for example by an operator of the server.

The server may be further configured to: receive a second user contact identifier to replace the stored first user contact identifier; and communicate a contact change alert to the first user contact identifier. The currently registered user may thus be given the opportunity to respond to a request to change the register user contact identifier, for example by sending a confirmation of contact change (indicating that they do want the first user contact identifier to be replaced by the second user contact identifier), or to send an indication that a contact change is not desired (which might indicate that a malicious entity is attempting to change the registered contact identifier).

The server may be further configured to, on receipt of a confirmation of contact change in response to the contact change alert, replace the first user contact identifier with the second user contact identifier. Optionally, the server may take no action to change the contact identifier until the confirmation of contact change is received. In this way, security of the protected function of the device may be improved because the contact identifier may only be reset when the registered user has confirmed that that is what they would like to be done.

The server may be further configured to suspend the function on the device (which may be achieved by suspending only the function of the device and/or by disabling the device altogether) until a confirmation of contact change is received in response to the contact change alert. In this way, security of the protected function of the device may be even further improved because an attempt to change the contact identifier would prevent everyone (even those in possession of the password) from accessing the protected function of the device until the registered user confirms that they would like the contact identifier to be changed.

The server may be further configured to, on receipt of an indication in response to the contact change alert that a contact change is not desired, suspend the function of the device (which may be achieved by suspending only the function of the device and/or by disabling the device entirely). In this way, security of the protected function of the device may be even further improved because a malicious attempt to change the contact identifier may result in all users of the device being preventing from accessing the protected function.

The first user contact identifier and/or second user contact identifier may each comprise at least one of an email address, a mobile telephone number, a fixed line telephone number and/or a postal address.

The present disclosure also provides a device (for example, a CPE or an M2M device) for obtaining a password for use in protecting a function of the device, the device being configured to: receive security data from a server (for example, a device management server); derive the password, at least in part, from the security data; and store the password as an access code for the protected function of the device.

The present disclosure also provides a device (for example, a CPE or an M2M device) for obtaining a password for use in protecting a function of the device, the device being configured to: communicate a device identifier to a server (for example, a device management server); receive security data from the server; derive the password, at least in part, from the security data; and store the password as an access code for the protected function of the device.

The protected function of the device may comprise any function of the device wherein a user of the device is required to enter the correct password in order to access the protected function. For example, the protected function may comprise at least one of: facilitation of internet access via the device, configuration/administration settings for the device and/or remote access to the device from the internet.

Preferably, the password is a human-readable code suitable for use by humans. For example, it may be an alpha-numeric code of suitable length to be communicated to, and used by, humans.

The device identifier may comprise at least one of a serial number for the device, an alpha-numeric code, a MAC address for the device, DNS name for the device and/or a static IP address for the device.

A device configured in this way can be manufactured, distributed and sold without a preset password for the protected function. The additional costs and overheads of generating and setting a unique preset password for each device may therefore be avoided. Furthermore, as is apparent from the above summary of the server and from the disclosures of this application as a whole, the security risks associated with generic and unique preset passwords may also be avoided.

Preferably, the security data comprises data using which a shared key (for example, Ks_NAF) is derivable according to a bootstrapping process, wherein the device is further configured to: derive the shared key using, at least in part, the security data, and derive the password, at least in part, from the shared key (for example, by hashing the shared key, by converting the shared key to base64, decimal or hex; by truncating the shared key to a human-convenient length, etc). Thus, the password is derivable, at least in part, from the security data. The bootstrapping process may be based on Generic Bootstrapping Architecture, GBA (including GBA Push).

The shared key obtained using the bootstrapping process is random and unique, so each password may also be random and unique. Thus, the device is able to derive a random and unique password for use in protecting the function of the device.

The device may be further configured to: establish a secure interface between the device and the server; and receive the security data from the server via the secure interface. The device may be further configured to: use a bootstrapping process to establish the secure interface between the device and the server. The bootstrapping process may be based on Generic Bootstrapping Architecture, GBA. In this instance, the security data may comprise the password; or wherein the device further comprises a plurality of stored codes, the security data may comprise an indication of which of the plurality of stored codes is to be used as the password.

Preferably, the device is further configured to: receive a user entered code; and if the user entered code matches the access code for the protected function, enable access for the user to the protected function of the device. Thus, a user may only be able to access the protected function of the device if they know the password that is stored as the access code for the protected function.

Optionally, the device is further configured to: if a user entered code that matches the access code for the protected function is not received within a period of time since storing the password as the access code for the protected function, disable the access code for the protected function. This may help to prevent an attacker doing a mass harvest of passwords that have not been used by the legitimate user of the device.

The device may further comprise a password reset trigger for actuation by a user of the device, wherein the device is further configured, on actuation of the password reset trigger, to: disable the access code for the protected function (for example, by deleting it or marking it inactive); and communicate the device identifier to the server for obtaining a new password for use in protecting the function of the device. The password reset trigger may be a dedicated reset button and/or a predefined sequence of actions on the device, for example holding down the power button for a period of time, or pressing a sequence of buttons on the device in a particular order, etc.

Also provided is a system comprising the server described above, the device described above, and a communications interface between the server and device for establishing a password shared by the server and the device.

Also provided is a method for providing security data to a device requiring a password for use in protecting a function of the device, the method comprising: receiving a device identifier (for example, from the device, or from a different entity such as a customer interface equipment); communicating the security data to the device, wherein the password is derivable, at least in part, from the password data; and storing the device identifier with an association to the password.

Also provided is a method for obtaining a password for use in protecting a function of the device, the method comprising: receiving security data from a server; deriving the password, at least in part, from the security data; and storing the password as an access code for the protected function of the device.

Also provided is a method for obtaining a password for use in protecting a function of the device, the method comprising: communicating a device identifier to a server; receiving security data from the server; deriving the password, at least in part, from the security data; and storing the password as an access code for the protected function of the device.

Also provided is a method for obtaining a password for use in protecting a function of the device, the method comprising: communicating a device identifier to a server; communicating security data from the server to the device; deriving the password, at least in part, from the security data; and storing the password as an access code for the protected function of the device.

Also provided is a method for setting a password on a device, wherein the password is for use in protecting a function of the device, the method comprising: communicating a device identifier to the server (for example, communicating the device identifier from the device to the server, or communicating the device identifier from a further device, such as a customer interface equipment, to the server); the server communicating security data to the device, wherein the password is derivable, at least in part, from the security data; the device deriving the password, at least in part, from the security data and storing the password as the access code for the protected function; and the server storing the device identifier with an association to the password.

Any or all of the above features and/or methods and/or aspects can be combined in any suitable or compatible manner in order to arrive at additional aspects of the invention without departing from the described invention.

DRAWINGS

Aspects of the present disclosure shall be described, by way of example only, with reference to the following drawings, in which.

DETAILED DESCRIPTION

3GPP's Generic Bootstrapping Architecture (GBA) allows a client/customer device and server to agree a strong and unique new shared secret (or key) by "bootstrapping" from the key pre-shared between a SIM card (UICC) on the customer/client device and HLR/HSS. Advantageously, such a new shared key can be agreed regularly or whenever needed (for instance on change of owner or reset operations). Transformations based on the shared secret (or key) allow other keys to be derived or re-derived as required.

Cellular connectivity is not necessarily required for this bootstrapping as the protocol works over other types of connectivity (e.g. DSL, cable, fibre and Wi-Fi). Therefore, the described method and system may be used for different types of customer devices.

A customer device in the present disclosure may, for example, be a customer premises equipment (also known as customer-provided equipment) (CPE), or a machine-to-machine (M2M) device. A CPE may, for example, be a DSL or Cable Modem, a Home Wi-Fi Router, a Femtocell, a Set-top Box for pay TV etc. An M2M device may be any device wherein at least part of the device communications operations are autonomous (i.e., do not require user or operator interaction). For example, an M2M device may be a smart meter that provides utility meter readings autonomously to utility providers via a communications interface, or a vehicle control equipment that autonomously provides sensor readings to a vehicle servicing company and/or receives vehicle configuration updates or vehicle services control (such as remote unlocking of the vehicle) via a communications interface, or a street lighting control unit that may be managed or updated by a device management server via a communications interface, etc. In any event, an M2M device may be a relatively simple device, or a more complex device, which may be controlled, or managed, or provide data to a different entity server, or through which a different entity may provide a service, via a communications interface, without requiring any user or operator input. Nevertheless, a user/operator may still at times wish to access a protected function, for example configuration settings, of an M2M device.

Figure 1:
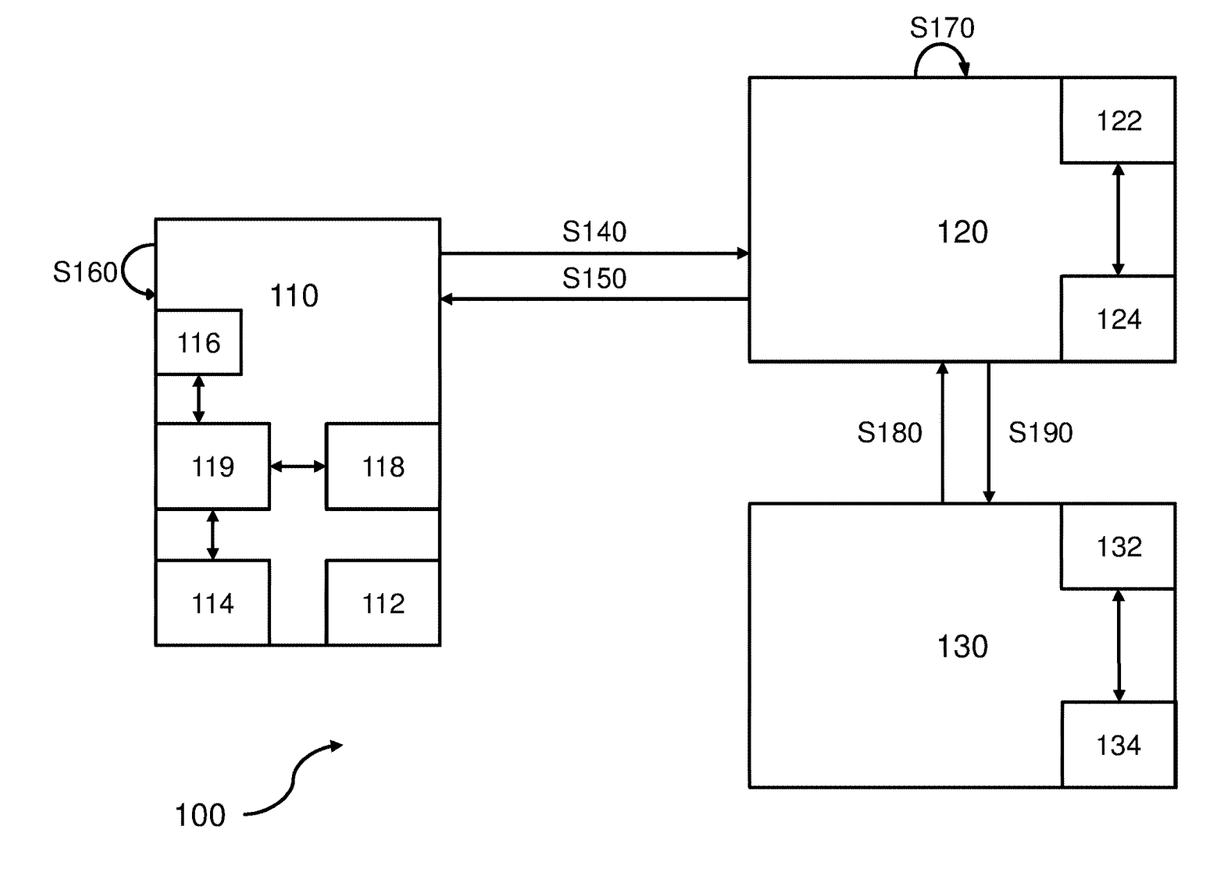
FIG. 1 shows a schematic representation of a customer device, a device management server and a customer interface equipment.

FIG. 1 shows a schematic diagram of a system 100 comprising a customer device 110, a device management server 120 and a customer interface equipment 130.

The customer device 110 (which, for example, may be a CPE or an M2M device, as explained above) comprises a serial number 112, a Universal Integrated Circuit Card (UICC) 114 (for example, a SIM card, smart card, etc), a reset button 116, a memory 118 and logic (or a computer program) 119. The logic 119 is coupled to the UICC 114, the reset button 116 and the memory 118. The logic 119 may comprise, for example, one or more processors or microprocessors, and/or any other suitable form of logic or chip(s), such as programmable logic, firmware or any other configurable system. The serial number 112 may be electronically stored in the customer device 110, for example in the memory 118, and may optionally be visibly displayed on the outside of the customer device and/or any associated documentation. The reset button 116 is accessible to a user of the customer device 110 such that the user may actuate the reset button 116.

The device management server 120 comprises logic (or a computer program) 122 coupled to a memory 124. The logic 122 may comprise, for example, one or more processors or microprocessors, and/or any other suitable form of logic or chip(s), such as programmable logic, firmware or any other configurable system. The device management server 120 may be any suitable type of server or electronic equipment or network entity. For example, it may be a standalone server, or it may be implemented as a function within a larger server. Furthermore, its functionality (described below) may be separated across multiple servers, each of which may be co-located or located at different geographical locations, such that the device management server 120 comprises a plurality of servers or electronic equipment that interface with each other to perform the functions of the device management server 120. The device management server 120 may be operated or run by any suitable entity or party, for example the customer device manufacturer, or a wholesaler or retailer of the customer device 110, or anyone else. Optionally, several different parties could operate or run the device management server 120 (for example, if multiple passwords are used for different purposes in connection with different services on the customer device 110).

The customer interface equipment 130 comprises logic 132 coupled to a memory 134. The logic 132 may comprise, for example, one or more processors or microprocessors, and/or any other suitable form of logic or chip(s), such as programmable logic, firmware or any other configurable system. The customer interface equipment 130 may be any suitable electronic device that enables a customer to perform the operations described below. For example, the customer interface equipment 130 may be a desktop computer, a laptop computer, a tablet, a smart-phone, etc.

The customer device 110 comprises at least one protected function, wherein a user of the customer device 110 is required to enter the correct password in order to access the protected function. The protected function may comprise the facilitation of internet access via the customer device 110, configuration/administration settings for the customer device 110 and/or remote access to the customer device 110 from the internet. The customer device 110 is configured such that on shipping to the customer, it initially does not include a preset password for the protected function. Instead, when the customer device 110 is first switched on/connected, it establishes a password for the protected function.

The password is a human-readable password, such that it may be communicated to, and used by, a human-user. It may be an alpha-numeric code of suitable length for use by humans.

On first switch on/connection, the customer device 110 communicates with the device management server 120 in step S140. Whilst FIG. 1 shows communication in step S140 as being directly between the customer device 110 and the device management server 120, it will be appreciated that it may be routed via any number of other intermediate devices (for example, network routers etc). The customer device 110 may be preconfigured with a suitable address for the device management server 120, or the communication may be routed to the device management server 120 by any other suitable means, for example by network routing. The communication in step S140 comprises the serial number 112, or some identifier of the serial number 112 (for example, where the device management server 120 has access to the serial numbers for all customer devices for which it is responsible and the customer device 110 may be able to identify its serial number to the device management server 120 using a short form identifier). The communication may optionally also comprise an indicator that a new password is required, or the device management server 120 may recognise that a new password is required by virtue of receiving the serial number 112.

The interface using which communications between the customer device 110 and device management server 120 are carried may utilise any form of connectivity, for example Digital Subscriber Line (DSL), Cable, Fibre, cellular connectivity (for example, GPRS, EDGE, 3G, LTE etc), etc.

In Step S150, in order to establish the password at the customer device 110, the customer device 110 and device management server 120 may engage in a GBA bootstrapping process such that the customer device 110 is authenticated to the device management server 120 and a new shared key (or shared secret), for example Ks_NAF, is agreed between the customer device 110 and device management server 120. As part of this process, the customer device 110 utilises the UICC 114, which comprises key material, such as K or Ki, and any other required functionality, for example a USIM application, for use in the GBA process. The process for authenticating the customer device 110 and device management server 120 and agreeing a new shared key Ks_NAF is described in detail at http://www.3gpp.org/DynaReport/

33220.htm (3GPP TS 33.220 Generic Authentication Architecture (GAA); Generic Bootstrapping Architecture (GBA)).

In step S160, the customer device 110 uses, at least in part, the new shared key to derive at least one human-readable password for the protected function of the customer device 110. The password may be derived, at least in part, from the new shared key, for example: by using a hashing algorithm; by converting to base64, decimal or hex; by truncating to a human-convenient length; etc. The customer device 110 then stores the password, for example in memory 118 and/or the UICC 114, as the access code for the protected function, such that the user must supply the password to the customer device 110 in order to access the protected function (the way in which the user may obtain the password is described in detail later). Optionally, the customer device 110 may be configured to store the password as the access code for two or more protected functions.

Optionally, in step S160, the logic 119 is configured to derive two or more different human-readable passwords from the new shared key, for example by using two or more different derivation techniques and/or applying the same derivation technique in different ways (for example, hashing the shared key in different ways). The two or more passwords may be stored as access codes for a protected function so that a user can supply any one of the passwords to the customer device 110 in order to access the protected function (enabling, for example, different users of the same customer device 110 to have their own passwords). Alternatively, each of the two or more passwords may be stored as access codes for different protected functions of the customer device 110, such that from the same new shared secret, different protected functions may have different passwords.

Optionally, the logic 119 may be configured to disable the stored access code (for example, by deleting the stored access code, or by marking the stored access code as inactive or void) if it has not been used by a user for a period of time after the password is set as the access code. The period of time may be any suitable amount of time, for example, one hour, 10 hours, 1 day, 3 days, 1 week, 2 weeks, 1 month, etc, after setting the password as the access code. This may help to prevent an attacker doing a mass harvest of passwords (by requesting them from the server 120, as explained later) that have not been collected and used by the legitimate user of the customer device 110. The logic 119 may be further configured to obtain a new password by carrying out Step S140 again after disabling the stored access code.

In step S170, the logic 122 of the device management server 120 performs a process corresponding to Step S160 in order to derive the same password(s) from the new shared key. The customer device 110 and device management server 120 may agree between them how the password(s) is to be derived (for example during Step S150 or at a later time). Alternatively, the logic 119 of the customer device 110 may be configured to derive the password(s) from the shared key and communicate the derivation technique to the device management server 120 (for example, during Step S140, or S150 or at any other time), for example by indicating which of a plurality of pre-agreed derivation techniques is to be used on this occasion, or by encapsulating and sending the derivation technique to the device management server 120. In a further alternative, the logic 119 of the customer device 110 may be configured always to use the same derivation technique. The logic 122 of the device management server 120 may be configured to recognise what the customer device 110 is (for example, which particular, unique device it is, or which make and/or model device it is etc) and look-up in the memory 124, or in some other location accessible to the device management server 120, which derivation technique it must use for that device.

After the device management server 120 has derived the password, both the customer device 110 and the device management server 120 will have the password. Thus, a password shared by the customer device 110 and the device management server 120 will have been established.

Furthermore, in Step S170, the logic 122 of the device management server 120 stores an association between the password and the serial number of the customer device 110. For example, the password and serial number may both be stored in the memory 124 (and/or in some other location, such as a database, that is part of, or is accessible to, the device management server 120), in such a way that the serial number may subsequently be used to look up the corresponding password (as explained later). Alternatively, an association between the password and serial number may be stored by storing in the memory 124 (and/or in some other location, such as a database, that is part of, or is accessible to, the device management server 120) the serial number and data using which the password may be derived. For example, the serial number and the new shared key may be stored, such that the serial number may subsequently be used to look up the shared key, from which the logic 122 of the device management server 120 can derive the password associated with the serial number. In any case, regardless of what data is stored, the serial number is stored with an association to the password such that the device management server 120 is able to retrieve the password(s) associated with the serial number.

When a user wishes to access the protected function of the customer device 110 (for example, using the customer interface equipment 130), they will be asked for the password. If they do not have the required password (for example, because they have never tried to access the protected function before), they may request the password from the device management server 120.

In step S180, the user connects to the device management server 120 (for example, via a web-page etc) and requests the password by presenting the serial number 112 (e.g. via a registration form), which may be displayed on the customer device 110 and/or associated documentation. In one example, as soon as a user attempts to access the protected function using the customer interface equipment 130 for the first time, the logic 119 may be configured to identify that access to the protected function has not previously been attempted and route a connection between the customer interface equipment 130 and the device management server 120 (for example, so that the device management server's 120 registration form is presented on a browser of the customer interface equipment 130, using which the user may present the serial number 112 to the device management server 120). In another example, the user may use the customer interface equipment 130 to connect to the device management server 120 (for example, by following instructions that accompany the customer device 110) in order to present the customer device's 110 serial number (e.g. via a registration form) to the device management server 120. Therefore, whilst FIG. 1 shows communication steps S180 and S190 passing directly between the device management server 120 and customer interface equipment 130, it will be appreciated that they may be routed via the customer device 110 and/or any other intermediate devices (for example, network routers etc). The interface using which the connection between the device management server 120 and the customer interface equipment 130 is carried may utilise any form of connectivity, for example DSL, Cable, Fibre, cellular connectivity (for example, GPRS, Edge, 3GPP, LTE etc), etc.

If there are multiple passwords associated with the serial number 112, the user may optionally request any one or more or all of them.

Having received the serial number 112 from the customer interface equipment 130, the logic 122 of the device management server 120 retrieves the associated password(s) (for example, by using the serial number 112 to look up the password stored in memory 124, or elsewhere, or to look up data, such as the shared key, stored in memory 124, or elsewhere, and derive the associated password).

In Step S190, the device management server 120 returns the password to the customer interface equipment 130, such that the user can be informed of what the password is, for example by displaying it on a display of the customer interface equipment 130. If there are multiple passwords associated with the serial number 112, one or more or all of them may be transmitted to the customer interface equipment 130, in accordance with the request of the user in Step S180 and/or the policy of the device management server 120.

Optionally, the processor 132 of the customer interface equipment 130 may store the password, for example in the memory 134, or in another location on or accessible to the customer interface equipment 130.

Optionally, before returning the password to the customer interface equipment 130 in Step S190, the device management server 120 may check to see if the password has previously been requested and/or transmitted to the customer interface equipment 130 and/or to any other entity. If the password has previously been requested and/or transmitted, the logic 122 of the device management server 120 may be configured to refuse the request for the password. In this case, the device management server 120 may either return nothing to the customer interface equipment 130 in response to the request for the password, or may return an error message in Step S190. In this way, only the first person to request the password may obtain it. This may increase the security of the protected function on the customer device 110 because multiple different entities may not independently obtain the password from the device management server 120.

If in Step S190 the password is transmitted to the customer interface equipment 130, the user may then present the password to the customer device 110 in order to access the protected function. For example, the user may use the customer interface equipment 130 to connect to the customer device 110 and attempt to access the protected function by presenting the password. Alternatively, the customer may use a further customer interface equipment to connect to the customer device 110 and attempt to access the protected function by presenting the password (for example, the user may use the customer interface equipment 130, such as a mobile telephone, to obtain the password as described above, and may use a further customer interface equipment, such as a desktop computer or a tablet computer, to connect to the customer device 110 and present the password). If the customer device 110 determines that the presented password matches the access code that is stored for the protected function, it may grant access to the protected function. If the presented password does not match the access code stored for the protected function, the customer device 110 may decline access to the protected function.

Additionally, or alternatively, if the correct password has been presented to the customer device 110 and access to the protected function is granted, the customer device 110 and customer interface equipment 130 may establish a relationship that enables the customer interface device 130 to continue accessing the protected function on subsequent occasions without requiring the password to be presented again (or at least without requiring the user to re-enter the password each time they wish to access the protected function), until such time that as the password for the protected function is changed (which is explained later).

Thus, according to the present disclosure, the customer device 110 may be manufactured, distributed and sold without a preset password for the protected function. Instead, a password can be established when the customer device 110 is turned on and is able to connect to the device management server 120. By deriving the password from a new shared key obtained using the GBA protocol, each established password may be random and unique, since each shared key established using the GBA protocol is different, and therefore previously unknown to any other person.

Thus, the security risks associated with setting a generic preset password for every customer device 110 may be avoided.

Furthermore, the additional costs and overheads of generating and setting a unique preset password for each customer device 110 may be avoided.

Furthermore, a preset password (whether a generic preset password, or a unique preset password) will not be printed on the customer device 110, or any associated documentation and/or displayed on a display of the customer device 110. Not only does this save costs (particularly in the case of a unique preset password), but it also improves security. This may be particularly true where the device management server 130 is configured to supply the password only to the first person to ask for it, which may prevent other users or guests from obtaining the password or cracking the password by automated searching etc.

Furthermore, the customer device 110 may be manufactured and sold to a customer without the device manufacturer, device retailer, operator of the device management server 120, or any other party or entity, knowing in advance who the user of the device will be. Any useful user information may instead be captured later (for example, in step S180), meaning that each customer device 110 may be manufactured and sold as a generic device.

Furthermore, because a large number of customer devices 110 already comprise a UICC 114 as standard, the customer device 110 may not need any, or any substantial, hardware modifications in order to implement the above described process. Even where a UICC 114 would need to be added to a customer device 110 in order to implement the above described process, this should usually be a straightforward, and therefore relatively low cost, modification.

The device management server 120 may be configured to disable the password (for example, by deleting the stored password (or data from which the password is derivable) or by marking the stored password (or data from which the password is derivable) as inactive or void) if it has not been requested by the customer interface equipment 130 within a period of time. The period of time may be any suitable amount of time, for example, 1 hour, 10 hours, 1 day, 3 days, 1 week, 2 weeks, 1 month etc. This may help to prevent an attacker doing a mass harvest of passwords that have not been collected by the legitimate user of the customer device 110.

Additionally, or alternatively, the customer device 110 may be configured to disable the password (for example, by deleting the stored password (or data from which the password is derivable) or by marking the stored password (or data from which the password is derivable) as inactive or void) if it has not been used by a user at least once within a period of time after it was set as the access code for the protected function. For example, if a user has not attempted to access the protected function using the password within the period of time after the password was set as the access code for the protected function, the customer device 110 may disable the password. The period of time may be any suitable amount of time, for example, 1 hour, 10 hours, 1 day, 3 days, 1 week, 2 weeks, 1 month etc. This may help to prevent an attacker doing a mass harvest of passwords that have not been used by the legitimate user of the customer device 110.

The customer device 110 shown in FIG. 1 comprises a reset button 116. A user may press the reset button 116 in order to reset the password for the protected function of the customer device 110 (for example, delete the existing access code for the protected function, which will have been established according to the process described above, and establish a new password for the protected function).

After the reset button 116 is actuated by a user, the logic 119 may be configured to disable the stored access code (for example, by deleting the stored access code, or by marking the stored access code as inactive or void) and request a new password by repeating step S140. Optionally, in step S140, in addition to requesting a new password in accordance with the above description of step S140, a password reset indicator may also be sent to the device management server 120 (alternatively, the logic 122 of the device management server 120 may be configured to recognise that because a password had previously been established for the customer device 110, a repeat of step S140 must indicate that the previous password has been reset at the customer device 110).

Having received the request for a password in Step S140 (and optionally also a password reset indicator), the logic 122 of the device management server 120 may disable its stored password (for example, by deleting the stored password, or by marking the stored password as inactive or void) and establish a new password shared between the customer device 110 and device management server 120 according to steps S150 to S170 described above. Because the new shared key established according to the GBA protocol will be different to the previous shared key, the new password will be different to the previous password. Steps S180 and S190 may then be performed as described above so that the new password is communicated to the user.

Thus, if the user has forgotten the password, or changed it to a new value which they have then forgotten, they may reset the customer device 110 to establish a new password, which they can obtain according to Steps S180 and S190 described above. This may also be useful if the customer device 110 is sold to a new owner so that a new password, known only to the new owner, may be established.

By configuring the password reset to generate a new password, rather than resetting to a generic preset password or a unique preset password, it is not possible for an unauthorised person in close proximity to the customer device 110 to reset the password for the protected function to a password that is displayed on or near the customer device 110. Furthermore, it means that the password is not reset to a password that has been used previously, thus preventing a previous owner/user from continuing to access the protected function using their old password.

In an alternative, the customer device 110 may not have a dedicated reset button 116 and the password may instead be reset by a user executing a particular sequence of actions on the customer device 110, for example holding down the power button for a period of time, such as 10 seconds. Additionally or alternatively, a password reset may be requested by actuating any other form of password reset trigger, for example by requesting it using an entity (for example, the customer interface equipment 130) that interfaces with the customer device 110. Alternatively, the customer device 110 may not be configured to enable the password to be reset at all.

Optionally, in Step S180 (or at a different time), the user may provide user contact information to the device management server 120. The user contact information may comprise, for example, at least one of an email address, a mobile telephone number, a fixed line (i.e., land-line) telephone number, a postal address, etc. The logic 122 of the device management server 120 may be configured to store the contact information (for example, in the memory 122, or in another location, such as a database, on, or accessible to, the device management server 122) with an association to the serial number and/or password for the customer device 110.

When the reset button 116 is actuated and the device management server 120 identifies a password reset from the communication in Step S140, the logic 122 on the device management server 120 may optionally be configured to send a notification of requested password change to the contact information associated with the serial number and/or password. In this way, the registered user/owner of the customer device 110 may be alerted of an attempt to reset the password for the protected function.

Optionally, the logic 122 on the device management server 120 may be configured to establish a new password with the customer device 110 only if the registered user/owner responds positively to the alert, confirming that they had requested the password reset. In this instance, the alert may comprise information regarding how to respond to the alert (for example, a web-address and/or telephone number using which their positive confirmation may be sent). Furthermore, until a positive confirmation is received, the logic 122 on the device management server 120 may additionally or alternatively be configured to disable the customer device 110 and/or suspend the protected function on the customer device 110 so that it cannot be used. This may be achieved by sending suitable control signalling to the customer device 110 via the interface between the customer device 110 and the device management server 120.

Optionally, the logic 122 on the device management server 120 may be configured to establish a new password with the customer device 110, unless the registered user/owner responds to the alert to indicate that they did not request the password reset. In this instance, the alert may comprise information regarding how to respond to the alert in the event that the registered user did not request the password reset (for example, a web-address and/or telephone number using which the registered user/owner may indicate that they did not request the reset). A response indicating that the password reset was not requested by the registered owner/user may result in the device management server 120 not establishing a new password with the customer device 110 and/or disabling the customer device 110 and/or suspending the protected function on the customer device 110 so that it cannot be used. If a new password has already been established before the registered user/owner has responded, the logic 122 on the device management server 120 may be configured to: notify the customer device 110 that the new password should be disabled; and/or disable the customer device 110; and/or suspend the function on the customer device 110 that is protected by the password that had been reset. This may be achieved by sending suitable control signalling to the customer device 110 via the interface between the customer device and device management server 120.

By alerting the registered user/owner of a password reset in this way, the registered user/owner may be protected from rogue password resets (requested, for example, by thieves, unauthorised visitors or unauthorised household residents, such as children, etc).

The device management server 120 may be configured to allow a change in the user contact information. A user may submit to the device management server 120 new user contact information to replace the previous user contact information that is stored by the device management server 120 (for example, second user contact information to replace first user contact information stored by the device management server 120). The logic 122 on the device management server 120 may be configured to allow this change to take place at any suitable time, but preferably a user may be given the opportunity to change the user contact information when a password is reset (for example, by submitting the new user contact information when retrieving the new password in Step S180). In this way, if a registered user's contact details change (for example, they have a new telephone number and/or email address), the registered user may update their contact information. Furthermore, if the customer device 110 is sold, the user contact information of the new owner may be registered with the device management server 120.

Optionally, when new user contact information (second user contact information) is submitted, the logic 122 on the device management server 120 may be configured to send a notification to the registered user/owner using the previous user contact information (the first user contact information). The logic 122 of the device management server 120 may be configured to accept the new user contact information only if the registered user/owner responds positively to the alert sent to the existing user contact information, confirming that the change in contact information should be accepted. In this instance, the alert may comprise information regarding how to respond to the alert (for example, a web-address and/or telephone number using which their positive confirmation may be sent). Furthermore, until a positive confirmation is received, logic 122 of the device management server 120 may additionally or alternatively be configured to disable the customer device 110 and/or suspend the protected function on the customer device 110 so that it cannot be used. This may be achieved by sending suitable control signalling to the customer device 110 via the interface between the customer device 110 and the device management server 120.

Optionally, the logic 122 on the device management server 120 may be configured to accept the new user contact information, unless the registered user/owner responds to the alert sent to the previous user contact information to indicate that the change in contact information should not be accepted. In this instance, the alert may comprise information regarding how to respond to the alert in the event that the registered user did not request the change in contact information (for example, a web-address and/or telephone number using which the registered user/owner may indicate that they did not request the reset). A response indicating that the change in contact information should not be accepted may result in the device management server 120 not accepting the new user contact information and/or disabling the customer device 110 and/or suspending the protected function on the customer device 110 so that it cannot be used. If the new user contact information has already been accepted before the registered user/owner has responded, the device management server 120 may be configured to: delete the new user contact information and optionally re-instate the previous user contact information; and/or disable the customer device 110; and/or suspend the function on the customer device 110 that is protected by the password. This may be achieved by sending suitable control signalling to the customer device 110 via the interface between the customer device 110 and the device management server 120.

Optionally, in addition, or as an alternative, to the password reset notification technique described above, the logic 122 in the device management server 120 may be configured to monitor the number of times a password is reset in a period of time (for example, in an hour, in five hours, in 12 hours, in one day, in four days, in one week, in three weeks, in one month etc etc). If the number of times a password is reset in the period of time exceeds a threshold value (for example, if the password is reset more than three times in a day, or more than five times in a week, or more than 10 times in a month etc etc), a multiple password resets flag may be set. Setting of the multiple password resets flag may result in human investigation by an operator of the device management server 120, or some other suitable person (for example, an entity contracted by the operator of the device management server 120 to investigate such flags). Human investigation may identify rogue behaviour taking place at the customer device 110 (for example, some sort of war of control), in response to which the customer device 110 may be disabled and/or the protected function on the customer device 110 suspended. This may be achieved by sending suitable control signalling to the customer device 110 via the interface between the customer device 110 and device management server 120 (or any other suitable entity). Additionally, or alternatively, the registered user/owner may be notified of the password reset flag, in an analogous manner to that described above in respect of password reset alerts.

Although specific aspects have been described, it will be recognised that a number of variations or modifications may be employed. For example, rather than identifying the customer device 110 using the serial number of the device (for example, in steps S140 and S180), the customer device 110 may be identified using any customer device identifier. For example, the customer device identifier may be any human-readable code, such as an alpha-numeric code, MAC address, DNS name, static IP address, etc that is uniquely associated with the customer device 110 and that is known to the owner of the customer device 110 (for example, because it is displayed on the customer device 110 and/or associated documentation).

In the above described process, a password shared between the customer device 110 and device management server 120 is established by the customer device 110 and device management server 120 using a GBA bootstrapping process to agree a new shared key in Step S150 and then each deriving the password from the new shared key in Steps S160 and S170. However, in an alternative, the new shared key may be used to establish a secure interface/communication channel between the customer device 110 and device management server 120 (using any suitable security protocol, for example Transport Layer Security (TLS), Datagram Transport Layer Security (DTLS), ETSI TS 102.225 etc). The password may then be generated by one of the customer device 110 or the device management server 120 (for example, by deriving it from the new shared key, or in any other suitable way, for example by generating a random alphanumeric code) and then passed to the other via the secure interface/communications channel, such that both the customer device 110 and the device management server 120 have the password.

In a further alternative, the customer device 110 may be provisioned with a plurality of codes (at the time of device manufacture, or at a later time) and the device management server 120 may also have access to the plurality of codes (for example, stored in the memory 122, or in another location in, or accessible to, the device management server 120). The plurality of codes may comprise, for example, 1000, 10000, 50000, 100000, 1000000, etc codes. The device management server 120 may then select (randomly or pseudo-randomly) which of the codes is to be used as the password and communicate that to the customer device 110 in Step S150 via a secure interface/communications channel, for example by indicating which number code is to be the password (for example, the 4327$^{th}$ code, or 104008$^{th}$ code, etc).

Where a shared key is agreed between the customer device 110 and the device management server 120 as part of establishing the password, any suitable type of key or password agreement process (particularly any automated key or password agreement process) may be employed, not just bootstrapping.

Where bootstrapping is performed between the customer device 110 and the device management server 120, it may be performed using any suitable bootstrapping process, not necessarily GBA.

Furthermore, where a secure interface/communications channel is established between the customer device 110 and the device management server 120, rather than using a bootstrapping process to establish the secure interface/communication channel, any suitable process may be used.

In the above described aspects, the customer device 110 comprises a UICC 114. However, when a shared password is established using a technique that does not require the bootstrapping of a new shared secret (for example, when the password is chosen to be one of a plurality of codes and/or a secure interface/communications channel is established using a technique other than bootstrapping), the customer device 110 may not have a UICC 114. Furthermore, where functionality of a UICC 114 is required (for example, for a bootstrapping process), the necessary data and/or applications of a UICC 114 may alternatively be provisioned in software in the customer device 110, or in some other way not requiring a physical UICC 114. In a further alternative, a customer device 110 may be provided with a UICC 114 at the time of manufacture (either a removable UICC 114 or a fixed, for example soldered, UICC 114), or it may be manufactured with a UICC slot, such that a retailer and/or owner of the customer device 110 may insert a suitable UICC 114.

In the above described aspects, in Step S140, the device management server 120 receives the customer device identifier from the customer device 110 (for example, after the customer device 110 is turned on for the first time). However, in an alternative, the device management server 120 may receive the customer device identifier in Step 140 from any other suitable entity. For example, it may receive it from the customer interface equipment 130, such as when the user of the customer device 110 would like a password to be established for their new customer device 110. The device management server 120 may be able to use the customer device identifier to look up an address for the customer device 110 and Step S150 may take place as described above (for example, using a bootstrapping process such as GBA or GBA Push).

The interface between the customer device 110 and the device management server 120 may be terminated at any suitable location on the customer device 110, for example at a client (which may be located in the processor 119, or elsewhere), or at the UICC 114, etc.

The invention claimed is:

1. A server for providing security data to a device requiring a password for use in providing access to a protected function of the device, the server being configured to:
   receive a device identifier;
   communicate with the device to determine how the password is to be derived using the security data such that the server and the device agree to use an agreed-upon derivation process to derive the password;
   communicate the security data to the device, wherein the password is derivable by applying the agreed-upon derivation process on the security data;
   derive the password by applying the agreed-upon derivation process on the security data, wherein deriving the password includes applying the agreed-upon derivation process in at least two different ways to generate at least two different passwords, one of which is the password used to access the protected function and another of which is separate password used to access a separate protected function of the device, such that multiple different passwords are generated using the same security data; and
   store the device identifier with an association to the password,
   wherein the protected function is provided on the device and is not accessible without access to the password.

2. The server of claim 1, wherein the security data comprises data from which a shared key is derivable by the device according to a bootstrapping process, and wherein the password is derivable from the shared key, and the bootstrapping process is based on Generic Bootstrapping Architecture (GBA).

3. The server of claim 1, further configured to:
   establish a secure interface between the device and the server; and
   communicate the security data to the customer device via the secure interface;
   use a bootstrapping process to establish the secure interface between the device and the server, and
   wherein the bootstrapping process is based on Generic Bootstrapping Architecture (GBA).

4. The server of claim 3, wherein the security data comprises the password or an indication of which of a plurality of codes stored on the device is to be used as the password.

5. The server of claim 1, further configured to:
   receive a first user contact identifier;
   store the first user contact identifier with an association to the device identifier and/or the password;
   recognise that a password reset trigger on the device has been actuated; and
   communicate a password reset alert to the first user contact identifier.

6. The server of claim 5, further configured to, on receipt of a confirmation of password reset in response to the password reset alert:
   communicate new security data to the device, wherein a new password is derivable from new security data; and
   store the device identifier with an association to the new password.

7. The server of claim 6, further configured to:
suspend the function on the device until the confirmation of password reset is received in response to the password reset alert; and
on receipt of an indication in response to the password reset alert that a password reset is not desired:
suspend the function of the device.

8. The server of claim 1, further configured to:
recognise that a password reset trigger on the device has been actuated;
set a multiple resets flag if the number of password reset trigger actuations in a reset period of time exceeds a reset threshold.

9. The server of claim 5, further configured to:
receive a second user contact identifier to replace the stored first user contact identifier;
communicate a contact change alert to the first user contact identifier; and on receipt of a confirmation of contact change in response to the contact change alert:
replace the first user contact identifier with the second user contact identifier.

10. The server of claim 9, further configured to:
suspend the function on the device until a confirmation of contact change is received in response to the contact change alert.

11. The server of claim 9, further configured to, on receipt of an indication in response to the contact change alert that a contact change is not desired:
suspend the function of the device.

12. The server of claim 5, wherein the first user contact identifier and/or second user contact identifier each comprise at least one of an email address, a mobile telephone number, a fixed line telephone number and/or a postal address.

13. A device for obtaining a password for use in providing access to a protected function of the device, the device being configured to:
communicate with a server to determine how the password is to be derived using security data such that the device and the server agree to use an agreed-upon derivation process to derive the password;
receive the security data from a server;
derive the password from the security data by applying the agreed-upon derivation process on the security data, wherein deriving the password includes applying the agreed-upon derivation process in at least two different ways to generate at least two different passwords, one of which is the password used to access the protected function and another of which is a separate password used to access a separate protected function of the device, such that multiple different passwords are generated using the same security data; and
store the password as an access code for the protected function of the device,
wherein the protected function is provided on the device and is not accessible without access to the password.

14. The device of claim 13, wherein the security data comprises data using which a shared key is derivable according to a bootstrapping process, wherein the device is further configured to:
derive the shared key using the security data, and
derive the password, at least in part, from the shared key,
wherein the bootstrapping process is based on Generic Bootstrapping Architecture (GBA).

* * * * *